Patented Dec. 21, 1937

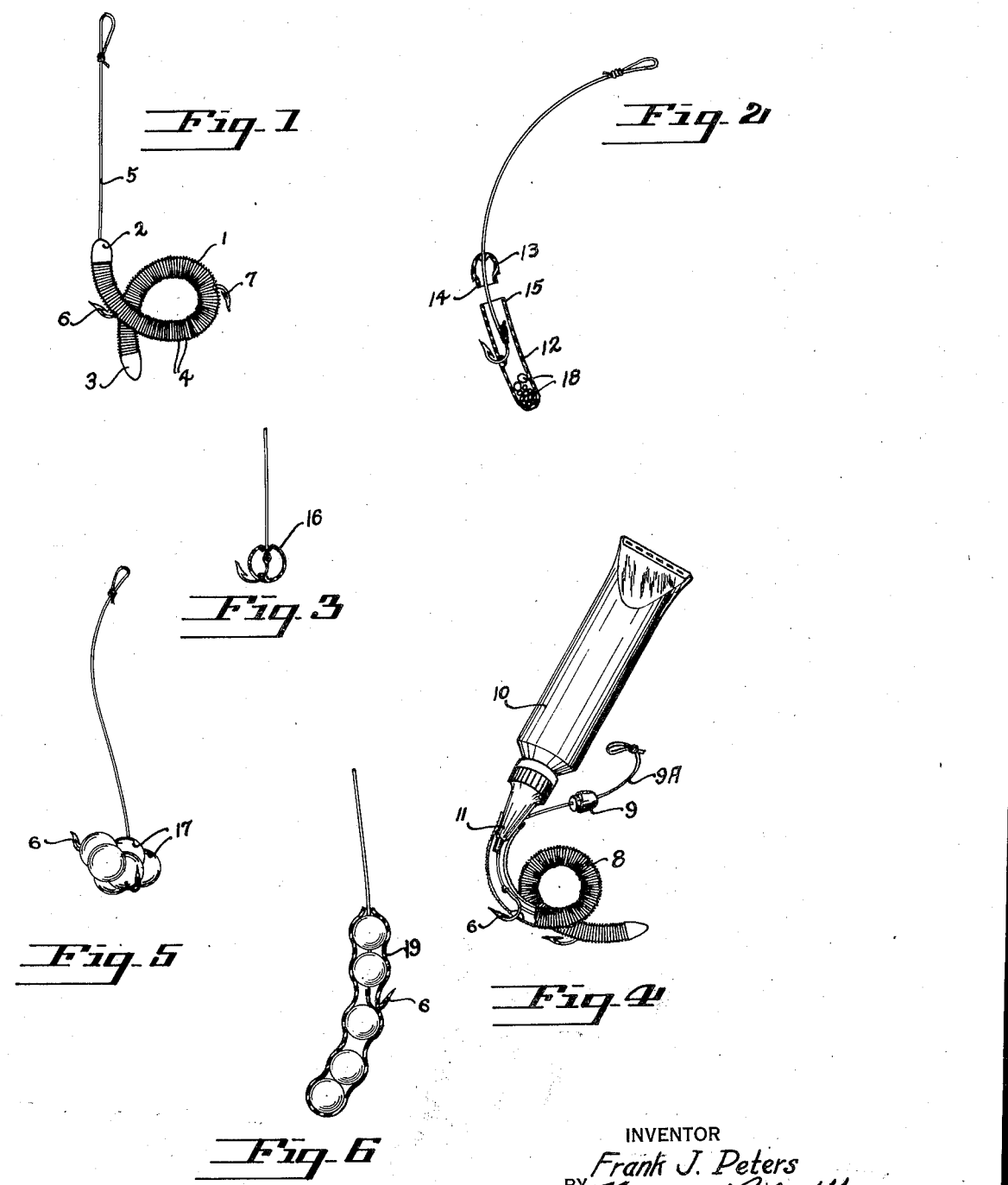

2,102,739

UNITED STATES PATENT OFFICE 2,102,739

FISH BAIT

Frank J. Peters, Portland, Oreg.

Application July 7, 1936, Serial No. 89,335

1 Claim. (Cl. 43—42)

The purpose of my invention is to provide a fisherman with a bait that may be changed at frequent intervals and one that may be made to simulate grubs, angle worms, salmon eggs and other bait objects.

I provide a rubber shell or jacket that may be made transparent and thin walled and leave one end of the shell or jacket open to facilitate the shell being filled with various ingredients, to increase the bait quality of the product.

In the use of my new and improved jacket, the leader passes longitudinally through the jacket. The pointed end of the hook extends through the jacket wall. Where the angle worm simulating jacket is relatively long more than one fish hook may be disposed within the jacket, or where a group of salmon eggs is to be used in fishing for fish of the larger size. A group of hooks may be secured to the end of the leader and a plurality of jackets made of rubber or other suitable material and simulating the salmon eggs may be disposed upon the body of the fish hooks.

The primary purpose and object of my invention is to furnish the fisherman with bait that will be clean to handle and that may be frequently changed in order that a lure may be used that will be efficient as a fish bait.

A still further object of my invention is to provide a fish bait that will closely resemble the angle worm or grub or other lure that is commonly used by fishermen and one that does not require threading or placing upon the fish hook and one that will be clean and above all, one that will have a long and useful life.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a side view of one of my new and improved baits, simulating an angle worm shown attached to a leader having fish hooks attached thereto, with the points of the fish hook extending through the side walls of the bait jacket.

Fig. 2 is a sectional view of a modified form of bait jacket, shown in place upon a fish hook and leader. In this view one of the ends of the bait jacket is made in the form of a cap. This facilitates the placing of bait simulating material within the jacket.

Fig. 3 is a side view of a fish hook and fragmentary side view of the leader illustrating a bait unit disposed thereupon that simulates a salmon egg.

Fig. 4 is a side view, partially in section of the fish bait jacket that is secured to a plurality of fish hooks. This view is made partially in section with the end of the bait jacket shown spaced apart from the jacket and illustrates the filling of the bait jacket with the bait material from a filler tube.

Fig. 5 is a side view of a plurality of fish hooks having a leader secured thereto and upon which is disposed a plurality of bait units simulating salmon eggs.

Fig. 6 is a sectional view of the bait jacket in which is disposed a plurality of bait units simulating salmon eggs. In this view the leader and fish hook are shown secured to the bait jacket.

Like reference characters refer to like parts throughout the several views.

I make my bait jacket of any suitable material, as transparent live rubber. I represents the body of the jacket made to resemble an angle worm having plain ends 2 and 3. I provide ribs 4 circumferentially about the body of the bait jacket to make the same more nearly resemble that of an angle worm. In the use of my device I recommend that a leader 5 be used with the leader being made to run longitudinally of the body of the bait jacket and that one or more hooks 6 be secured to the leader. The number of hooks depending upon the size of the fish that are to be fished for determining the longitudinal length of the bait jacket that resembles the angle worm and the length, size and delineations upon the bait jacket depending upon the species of the fish to be caught.

I have here shown hooks 6 and 7 as being secured to the leader that runs longitudinally of the bait jacket. The shank of the hook and the body portion of the hook are confined within the bait jacket with the bearded points only extending outward through the outer shell of the fish bait jacket.

In Fig. 4, I illustrate one of the preferred means of filling the bait jacket in which the jacket 8 has a removable stopper 9. The leader 9A runs longitudinally of the shell of the simulated worm. By the removal of the stopper from the shell a filler tube 10 may be used for filling the shell of the bait jacket by inserting the point 11 of the filler tube within the bait jacket. The bait jacket may be filled with bait material that will have an odor and will be of a color to resemble bait of different characters. By providing a plurality of tubes of filler material the bait jacket may be emptied and an additional material of different color may be placed therein.

In Fig. 2 I have shown the bait jacket 12 having a stopper 13 removably placeable within the end of the jacket. In this instance the jacket and stopper are made to simulate that of a grub and the stopper 13 has a restricted neck 14 shaped and fashioned to precisely fit within the end 15 of the jacket. The leader passes outwardly through the head or stopper 13 and the shank of the hook is disposed within the shell of the jacket with the barbed pointed end of the hook extending outwardly through the shell. The jacket or shell may be filled with any suitable colored material, as illustrated at 18 to give life and color to the grub and to produce added color within the grub.

Where salmon eggs or other fish eggs are to be used as bait I make my jacket of thin live rubber, make the same round and pass the leader transversely through the salmon eggs with the pointed end of the hook being disposed upon the outside of the egg 16.

Where a plurality of salmon eggs are to be used in a cluster, a plurality of hooks may be placed upon the end of the leader and the units of bait resembling salmon or other fish eggs are placed upon the shanks of the hooks, as illustrated at 17 in Fig. 5. A jacket may be made, as illustrated in Fig. 6, having a plurality of round colored fish egg units disposed therein within the leader extending and being disposed within the jacket with the pointed end of the hook extending therethrough and with the fish egg units being spaced apart and somewhat larger than the normal diameter of the jacket 19 to give a corrugated appearance upon the outside of the jacket material.

I claim:

A new article of manufacture comprised of a jacket made of stretchable material and delineated upon its exterior to resemble live bait and a fish hook and a leader associated with the jacket and means for opening and closing the jacket to facilitate the filling and the emptying of the jacket with bait material of the desired color.

FRANK J. PETERS.